United States Patent
Ferrie

(10) Patent No.: US 7,698,742 B1
(45) Date of Patent: Apr. 13, 2010

(54) METHOD AND APPARATUS FOR SCANNING EXCLUSIVELY LOCKED FILES

(75) Inventor: Peter Ferrie, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 1044 days.

(21) Appl. No.: 11/398,037

(22) Filed: Apr. 4, 2006

(51) Int. Cl.
*G06F 17/30* (2006.01)
*G06F 11/00* (2006.01)

(52) U.S. Cl. .............................. 726/24; 726/27; 726/30

(58) Field of Classification Search .................. 726/24, 726/27, 30
See application file for complete search history.

(56) References Cited

OTHER PUBLICATIONS

High-Speed Collisions; Peter Ferrie Jan. 2, 2008.*
Kernel and shell based applications integrity assurance; Mohay, G.; Zellers, J.; Computer Security Applications Conference, 1997. Proceedings., 13th Annual Dec. 8-12, 1997 pp. 34-43.*
Optimal Implementation of Continuous Data Protection (CDP) in Linux Kernel; Xu Li; Changsheng Xie; Qing Yang; Networking, Architecture, and Storage, 2008. NAS '08. International Conference on Jun. 12-14, 2008 pp. 28-35.*
Research on Active Defence Technology with Virus Based on K-Nearest Neighbor Algorithm of Kernel; Xuedou Yu; Environmental Science and Information Application Technology, 2009. ESIAT 2009. International Conference on vol. 1, Jul. 4-5, 2009 pp. 685-688.*

* cited by examiner

*Primary Examiner*—David Y Jung
(74) *Attorney, Agent, or Firm*—Gunnison, McKay & Hodgson, L.L.P.; Philip McKay

(57) ABSTRACT

A method and apparatus for scanning exclusively locked files uses a kernel mode driver to scan the operating system's table of applications and identify a handle that owns an exclusive lock for an exclusively locked file. In one embodiment, the kernel mode driver then copies the handle and passes the handle over to a handle list of the anti-virus application requesting access to the exclusively locked file and provides the anti-virus application with the access handle reference number. Armed with the access handle reference number for the copied handle, the anti-virus application can then open the exclusively locked file and scan the exclusively locked file as it would any other file.

15 Claims, 4 Drawing Sheets

300

310 WINWORD.EXE

312 MyDocument.doc,   [Read-Write],   Offset 0
       312A             312B            312C

314 WinWord.exe,    [Read-Only],    Offset 300
        314A            314B             314C

320 CALC.EXE

330 NOTEPAD.EXE

332 TextFile.text,   [Read-Write],   Offset 2000
        332A             332B            332C

340 VIRUS.EXE

342 Virus.exe,    [Read-Only, EXCLUSIVE],   Offset 200
        342A          342B      342E            324C

350 ANTI-VIRUS.EXE

352 MyDocument.doc Handle            360

354 WinWord.exe Handle

356 TextFile.text Handle

FIG. 3A

310  WINWORD.EXE
        312A              312B            312C
312  MyDocument.doc,   [Read-Write],   Offset 0

314  WinWord.exe,    [Read-Only],    Offset 300
        314A             314B            314C

320  CALC.EXE

330  NOTEPAD.EXE

332  TextFile.text,   [Read-Write],    Offset 2000
        332A             332B              332C 340  VIRUS.EXE
        342A      342B         342E              324C
342  Virus.exe,   [Read-Only, EXCLUSIVE],    Offset 200

350  ANTI-VIRUS.EXE

352  MyDocument.doc Handle

354  WinWord.exe Handle              360

356  TextFile.text Handle

358  Virus.exe Handle

FIG. 3B

METHOD AND APPARATUS FOR SCANNING EXCLUSIVELY LOCKED FILES

BACKGROUND OF THE INVENTION

1. Field of the Invention

The present invention relates to computer system security. More particularly, the present invention relates to a system and method of detecting malicious code in a computing device.

2. Description of Related Art

Anti-virus applications typically protect a computing device from viruses, also referred to herein as malevolent applications, malicious code, or virus code, by examining the computing device's memory and file system for signs of virus infestation. This examination process is called scanning.

In order to fully scan a given computing devices memory and file system, all files associated with a suspect, or unknown, application, also referred to herein as simply an application, must be accessed by the anti-virus application scanner to check for any malicious code, i.e., virus code. Knowing this, the creators, also called Authors, of virus code are constantly seeking ways to prevent an anti-virus application from accessing, and scanning, virus files.

One current method used by virus Authors to prevent an anti-virus application from accessing, and scanning, virus files is the use of exclusively locked files. Exclusively locked files have been known since 2002. Most recently, Authors of spy ware, a form of malicious code, have begun using exclusively locked files to lock their executable virus files from scanning and thereby prevent detection, and removal, of these files by anti-virus applications.

Using exclusively locked files to prevent an anti-virus application from accessing, and scanning, and therefore detecting and removing, virus code is an effective method. This is because, currently, once a file has been exclusively locked, it is "owned" by the locking application, i.e., the application the file is marked for exclusive use by, and any other program, application or process, such as an anti-virus application, can not open the exclusively locked file for reading or scanning. Consequently, the anti-virus application can potentially fail to detect the virus code and fail to identify the file, and the parent application, as malevolent, i.e., the anti-virus application scan can return a "false negative" result in the presence of exclusively locked virus files.

It would be advantageous to provide an anti-virus application the capability to access, and scan, exclusively locked files so that exclusively locked virus files can be detected, and removed from a computing device.

SUMMARY OF THE INVENTION

In accordance with one embodiment, a computer-program product includes a computer readable medium containing computer program code that includes a malicious code identification, access and removal/disablement application for identifying and/or accessing and/or removing and/or disabling malicious code. In one embodiment, the malicious code removal application includes a process for scanning exclusively locked files that uses a kernel mode driver to scan the table of applications maintained by the operating system in memory. The kernel mode driver then identifies an application handle associated with an exclusively locked file. In one embodiment, the kernel mode driver copies the handle and then passes an access number associated with the handle over to an anti-virus application, also called herein an anti-virus program or "AVP" or a malicious code removal application, requesting access to the exclusively locked file. In one embodiment, the handle is added to the anti-virus applications handle list and, then, armed with the access handle reference number, the anti-virus application can then open the exclusively locked file and scan the exclusively locked file as it would any other file in its normal manner of operation.

In one embodiment, the kernel mode driver scanning the operating system's table of applications can readily identify a handle associated with an exclusively locked file since the handle list from the table of applications can readily be retrieved for a suspect application, along with the name of the object, i.e., the exclusively locked file, to which the handle refers. In addition, the list of handles associated with an exclusively locked file is, by definition, small because there can only be one handle that owns the exclusive lock, and any other handles associated with the application do not have access to the locked file at all. Consequently, retrieving the relevant handle list from the operating system's table of applications is a relatively simple, and fast, procedure.

The method and apparatus for scanning exclusively locked files described herein provides an anti-virus application the capability to access, and scan, exclusively locked files so that exclusively locked virus files can be detected, and removed, or disabled, from a computing device.

Embodiments are best understood by reference to the following detailed description when read in conjunction with the accompanying drawings.

BRIEF DESCRIPTION OF THE DRAWINGS

FIG. 3A is a representation of a portion of a table of applications maintained by the operating system in memory for a computing device according to one embodiment; and FIG. 3B is a representation of the portion of a table of applications maintained by the operating system in memory for a computing device of FIG. 3A, subsequent to the use of a process for scanning exclusively locked files according to one embodiment.

Figure 1:
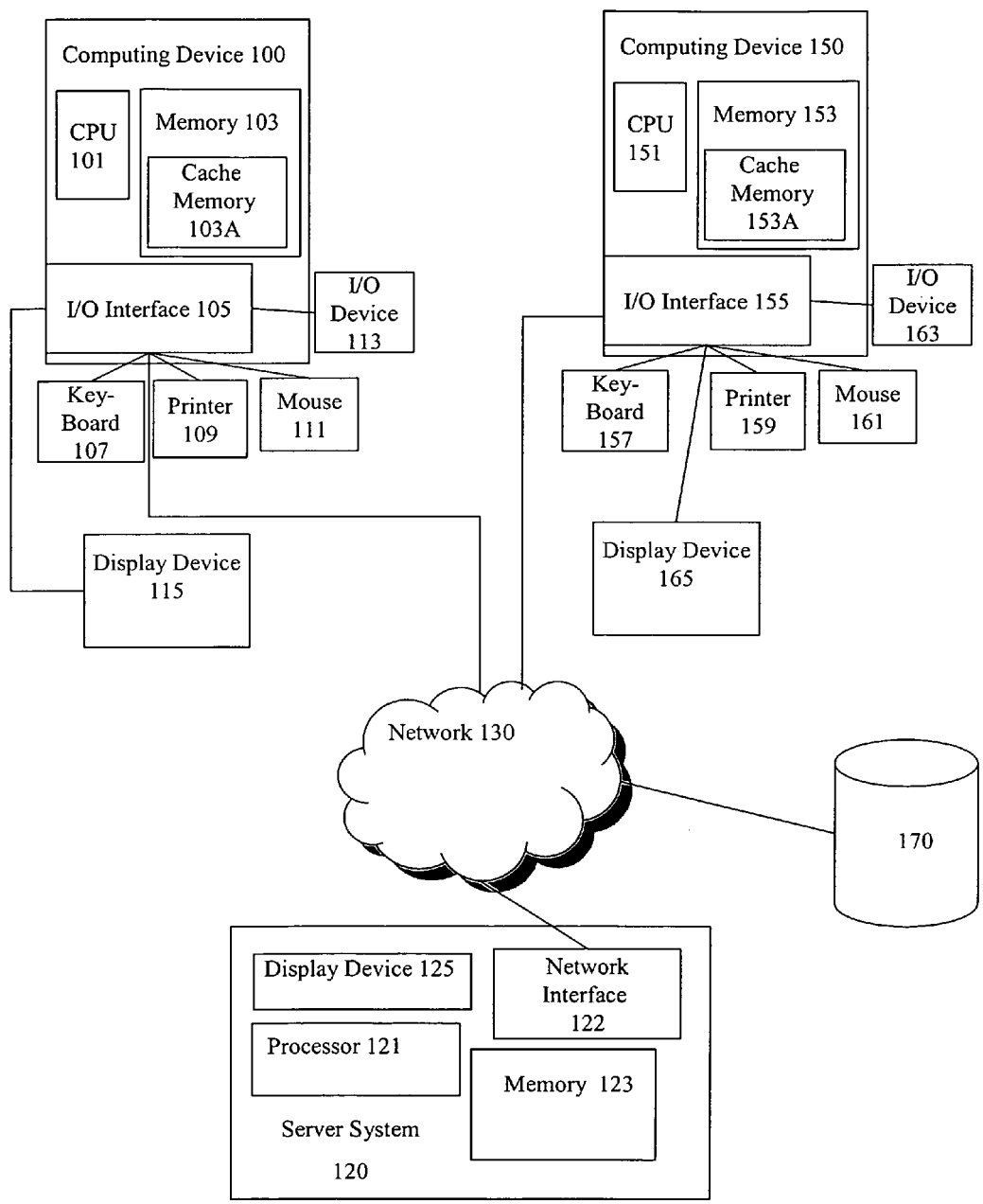
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are merely examples and that other architectures, modes of operation, orders of operation and elements/functions can be provided and implemented without departing from the essential characteristics and features of the invention.

DETAILED DESCRIPTION

The present invention will now be discussed with reference to the accompanying FIG.s, which depict one or more exemplary embodiments of the invention. The invention may be embodied in many different forms and should not be construed as limited to the embodiments set forth herein, shown in the FIG.s, and/or described below. Rather, these exemplary embodiments are provided to allow a complete disclosure that conveys the principles of the invention to those of skill in the art.

In the discussion above and below, the terms, "malicious code", "malevolent application", "virus code", "virus" and "viruses" are used interchangeably to denote code, applications, or portions of applications, programs or routines that that request, require, manipulate, or cause to be manipulated, operations upon, actions upon, transfers of, copies of, and movement of, data or other operations and actions within a native computer hardware or software system, or in anyway perform functions or actions, or cause functions or actions to be performed, that are not intended by the end-user or the designer of native hardware and software systems.

In one embodiment, a method and apparatus for scanning exclusively locked files includes a process for scanning exclusively locked files (200 in FIG. 2) that uses a kernel mode driver (not shown) to scan the table of applications (300 In FIG. 3A) maintained by the operating system (not shown) in memory (103, 153, 123 or 170 in FIG. 1). The kernel mode driver then identifies an application handle (342 in FIG. 3A) associated with an exclusively locked file (Virus.exe in FIG. 2). In one embodiment, the kernel mode driver copies the handle and then passes (219 in FIG. 2) the associated access handle reference number (not shown) associated with the handle copy (358 in FIG. 3B) over to an anti-virus application (350 in FIG. 3B), also called herein an anti-virus program or "AVP" or a malicious code removal application, requesting access to the exclusively locked file (203 in FIG. 2). In one embodiment, the handle copy is added (217 in FIG. 2) to the anti-virus applications handle list (360 in FIGS. 3A and 3B) in the list of applications maintained in memory by the operating system (300 IN FIGS. 3A and 3B). Then, armed with the access handle reference number, the anti-virus application can then open the exclusively locked file and scan the exclusively locked file as it would any other file in its normal manner of operation.

The method and apparatus for scanning exclusively locked files described herein provides an anti-virus application the capability to access, and scan, exclusively locked files so that exclusively locked virus files can be detected, and removed, from a computing device.

Some embodiments are implemented in a computing device including a conventional computing system running a conventional operating system such as those distributed by Microsoft Corporation of Redmond Wash.; Apple Computer Inc. of Cupertino Calif.; any Unix operating system; any Linux operating system; the Palm OS series of operating systems; or any other operating system designed to generally manage operations on a computing device. In addition, as described more fully below, embodiments can be implemented on computing devices other than a conventional computing device such as, for example, a personal digital assistant, a cell phone, or other computing device capable of processing computer readable data. Computing devices also include those in which one or more computing resources are located remotely and accessed via a network, such as a Local Area Network (LAN), Wide Area Network (WAN), the Internet, or other electronic medium in which data may be exchanged between one computing device and one or more other computing device(s). Embodiments may be included as add-on software for existing software programs, packages or applications, and embodiments may be a feature of an application that is bundled with a computing device or sold separately. Some embodiments are a computer-program product that includes a computer readable medium containing computer program code that includes a malicious code identification, access and removal/disablement application for identifying and/or accessing and/or removing and/or disabling malicious code. In one embodiment, the malicious code removal application includes a process for scanning exclusively locked files. Some embodiments may also be implemented as functionality embedded in hardware devices and systems.

Hardware Architecture

More particularly, FIG. 1 is a block diagram of an exemplary hardware architecture for implementing one embodiment of a process for scanning exclusively locked files, such as process for scanning exclusively locked files 200, discussed below, that includes: a computing device 100, e.g., a first computing device; a computing device 150, e.g., a second computing device; a server system 120; and a database 170, all operatively connected by a network 130.

As seen in FIG. 1, computing device 100 typically includes a central processing unit (CPU) 101, hereinafter processor 101, an input output (I/O) interface 105, and a memory system 103, including cache memory 103A. Computing device 100 may further include standard user interface devices such as a keyboard 107, a mouse 111, a printer 109, and a display device 115, as well as, one or more standard input/output (I/O) devices 113, such as a compact disk (CD) or DVD drive, floppy disk drive, or other digital or waveform port, or other device capable of, inputting data to, and outputting data from, computing device 100. As discussed in more detail below, in one embodiment, a process for scanning exclusively locked files, such as process for scanning exclusively locked files 200, discussed below, can be loaded, in whole, or in part, into computing device 100 via I/O device 113, such as from a CD, DVD or floppy disk containing all, or part, of a process for scanning exclusively locked files, such as process for scanning exclusively locked files 200, discussed below.

Similarly, computing device 150 typically includes a central processing unit (CPU) 151, hereinafter processor 151, an input output (I/O) interface 155, and a memory system 153, including cache memory 153A. Like computing device 100, computing device 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing device 150. As discussed in more detail below, in one embodiment, a process for scanning exclusively locked files, such as process for scanning exclusively locked files 200, discussed below, can be loaded, in whole, or in part, into computing device 150 via I/O device 163, such as from a CD, DVD or floppy disk containing all, or part, of a process for scanning exclusively locked files, such as process for scanning exclusively locked files 200, discussed below.

Also shown in FIG. 1 is database 170. In one embodiment, database 170 is a designated server system or computing device, or a designated potion of a server system or computing device, such as systems 100, 150 and 120. In one embodiment, database 170 is a dedicated mass storage device implemented in software, hardware, or a combination of hardware and software. In one embodiment, database 170 is a web-based function. As discussed in more detail below, in one embodiment, a process for scanning exclusively locked files, such as process for scanning exclusively locked files 200, discussed below, is stored in whole, or in part, in database 170.

In one embodiment, computing devices 100 and 150, and database 170, are coupled to a server system 120 by network 130. Server system 120 typically includes a server system display device 125, a server system processor 121, a server system memory 123, and a server system network interface 122. As discussed in more detail below, in one embodiment, a process for scanning exclusively locked files, such as process for scanning exclusively locked files 200, discussed below, is stored in whole, or in part, in server system 120.

Network 130 can be any network or network system that is of interest to a user, such as a Local Area Network (LAN), a Wide Area Network (WAN), the Internet, or other network capable of allowing communication between two or more computing devices. In various embodiments, server system network interface 122 and I/O interfaces 105 and 155 include analog modems, digital modems, a network interface card, a broadband connection, or any other means for communicably coupling computing devices 100 and 150, and database 170, and server system 120 via network 130.

Those of skill in the art will readily recognize that the components shown in FIG. 1, such as computing devices 100 and 150, database 170, server system 120, and their respective components, are shown for illustrative purposes only and that architectures with more or fewer components can implement, and benefit from, the invention. Moreover, one or more components of computing device 100, computing device 150, database 170, and server system 120 may be located remotely from their respective system and accessed via a network. In addition, the particular type of, and configuration of, computing devices 100 and 150, database 170, and server system 120 are not essential to the present invention.

As discussed in more detail below, in one embodiment, a process for scanning exclusively locked files, such as process for scanning exclusively locked files 200, discussed below, is stored in whole, or in part, in memory system 103 and/or cache memory 103A, of computing device 100, and/or memory system 153 and/or cache memory 153A of computing device 150, and/or in server memory system 123 of server system 120 and/or in database 170, and executed on computing device 100 and/or computing device 150. As used herein, a memory refers to a volatile memory, a non-volatile memory, or any combination of the two.

Although a process for scanning exclusively locked files, such as process for scanning exclusively locked files 200, discussed below, is sometimes referred to herein, alternatively, as an application, a program, a component of a software system, or a component of a software package, or a component of a computing device, this terminology is illustrative only. In some embodiments, a process for scanning exclusively locked files, such as process for scanning exclusively locked files 200, discussed below, is capable of being called from an application or the operating system. In one embodiment, an application or program is generally defined to be any executable code. Moreover, those of skill in the art will understand that when it is said that an application, an operation, or a process takes some action, the action is the result of executing one or more instructions by a processor, such as processors 101 and 151, or server system processor 121. In one embodiment, execution of a process for scanning exclusively locked files, such as process for scanning exclusively locked files 200, discussed below, by processor 101, processor 151, or server system processor 121, results in the operations of an agent computer process (not shown) and/or a rule computer process (not shown).

In one embodiment, a process for scanning exclusively locked files, such as process for scanning exclusively locked files 200, discussed below, is a computer application or process implemented and/or run and/or stored, in full, or in part, in, or on, a computer program product. In one embodiment, a process for scanning exclusively locked files, such as process for scanning exclusively locked files 200 is part of a computer readable medium containing computer program code that includes a malicious code identification, access and removal/disablement application for identifying and/or accessing and/or removing and/or disabling malicious code implemented and/or run and/or stored, in full, or in part, in, or on, a computer program product. Herein, a computer program product comprises a medium configured to store or transport computer readable code. Some examples of computer program products are CD-ROM discs, DVDs, ROM cards, floppy discs, magnetic tapes, computer hard drives, servers on a network, such as server system 120 of FIG. 1, and signals transmitted over a network, such as network 130 of FIG. 1, or other media or methods capable of delivering computer readable data representing computer readable code. This medium may belong to a computing device, such as computing devices 100 and 150 of FIG. 1, described above. However, the medium also may be removed from the computing device.

For example, all, or part, of a process for scanning exclusively locked files, such as process for scanning exclusively locked files 200, discussed below, may be stored in a memory that is physically located in a location, such as server system memory 123, or database 170, of FIG. 1, different from a computing device, such as computing devices 100 and/or 150 of FIG. 1, utilizing a process for scanning exclusively locked files, such as process for scanning exclusively locked files 200, discussed below. In one embodiment, all, or part, of a process for scanning exclusively locked files, such as process for scanning exclusively locked files 200, discussed below, may be stored in a memory that is physically located separate from the computing device's processor(s), such as processors 101 and 151 of FIG. 1, and the computing device processor(s) can be coupled to the memory in a client-server system, such as server system 120 of FIG. 1, or, alternatively, via a connection to another computer, such as computing devices 100, 150 of FIG. 1, via modems and analog lines, digital interfaces and a digital carrier line, or wireless or cellular connections.

In one embodiment, the computing devices and/or server system running and/or utilizing and/or storing all, or part, of a process for scanning exclusively locked files, such as process for scanning exclusively locked files 200, discussed below, such as computing devices 100 and/or 150 and/or server system 120 of FIG. 1, is a portable computer, a workstation, a two-way pager, a cellular telephone, a smart phone, a digital wireless telephone, a personal digital assistant, a server computer, an Internet appliance, or any other device that includes components that can execute all, or part, of a process for scanning exclusively locked files, such as process for scanning exclusively locked files 200, discussed below, in accordance with at least one of the embodiments as described herein. Similarly, in another embodiment, a process for scanning exclusively locked files, such as process for scanning exclusively locked files 200, discussed below, is implemented on and/or run and/or stored on a computing device and/or server system that is comprised of multiple different computers, wireless devices, cellular telephones, digital telephones, two-way pagers, personal digital assistants, server computers, or any desired combination of these devices, that are interconnected to perform the methods as described herein.

In some embodiments, the means for storing all, or part, of a process for scanning exclusively locked files, such as process for scanning exclusively locked files 200, such as those listed above, are maintained, in whole, or in part, by: the user of a process for scanning exclusively locked files, such as process for scanning exclusively locked files 200 described below, or a user computing device; the provider of the process for scanning exclusively locked files, such as process for scanning exclusively locked files 200 described below; the provider of parent software system implementing a process for scanning exclusively locked files, such as process for scanning exclusively locked files 200 described below; or any other parties.

Process

Figure 2:
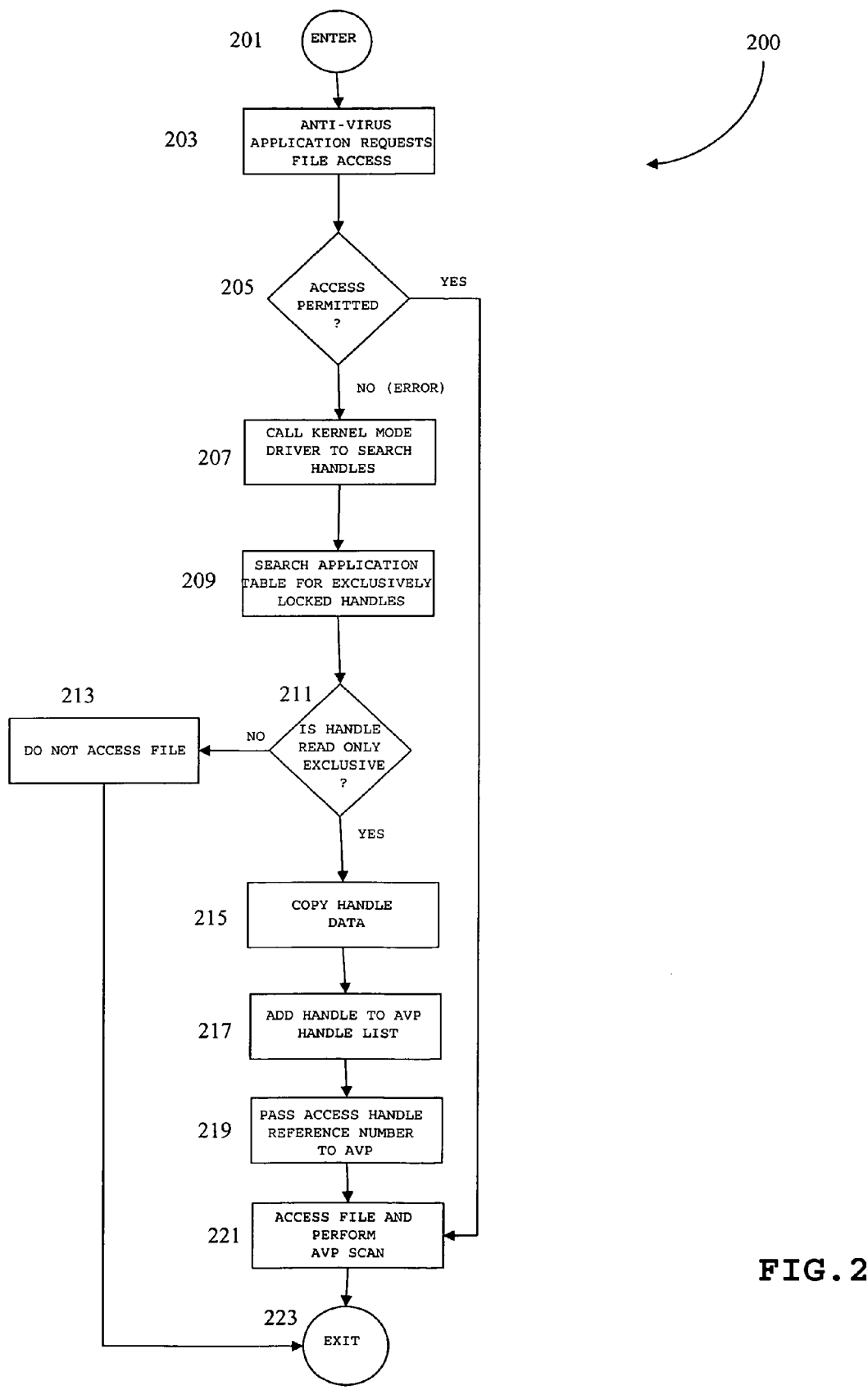
FIG. 2 is a flowchart depicting a process for scanning exclusively locked files according to one embodiment.

FIG. 2 is a flowchart depicting a process for scanning exclusively locked files 200 according to one embodiment. As seen in FIG. 2, process for scanning exclusively locked files 200 begins at ENTER OPERATION 201. From ENTER OPERATION 201, process flow proceeds to ANTI-VIRUS APPLICATION REQUESTS FILE ACCESS OPERATION 203.

In one embodiment, process for scanning exclusively locked files 200 is part of a computer readable medium containing computer program code that includes a malicious code identification and/or access and/or removal and/or disablement application, also referred to herein as a malicious code removal application, for identifying and/or accessing and/or removing and/or disabling malicious code implemented and/or run and/or stored, in full, or in part, in, or on, a computer program product. Herein, the malicious code removal application is also sometimes called a parent anti-virus system, a parent software system, or a parent system or an anti-virus application or an anti-virus program or "AVP".

As noted above, a typical anti-virus application, also referred to herein as an anti-virus program or "AVP", typically protects a computing device from viruses, also referred to herein as malevolent applications, malicious code, or virus code, by examining the computing device's memory and file system for signs of virus infestation. This examination process is called scanning. As also noted above, in order to fully scan a given computing devices memory and file system, all files associated with a suspect, or unknown, application, also referred to herein as simply an application, must be accessed by the anti-virus application scanner to check for any malicious code, i.e., virus code.

At ANTI-VIRUS APPLICATION REQUESTS FILE ACCESS OPERATION 203, an anti-virus application (not shown) implemented in conjunction with, as a parent software system for, or as a component of, process for scanning exclusively locked files 200, requests access to a given file for scanning. In one embodiment, the request for access to a given file by the anti-virus application is in the form of a request, typically made via a kernel mode driver, (not shown), to an operating system (not shown) of the computing device, such as computing devices 100, 150, discussed above implementing all, or part, of the anti-virus application and/or process for scanning exclusively locked files 200.

In one embodiment, when a file access request is made to the operating system by the anti-virus application, if the file is accessible, the operating system returns, via a kernel mode driver, an access "reference number" (user space) associated with an access "handle" (kernel space) to the anti-virus application that allows the anti-virus application access to the file. A handle is a structure in memory, typically in kernel mode designated memory space, that is maintained by the operating system. A given handle corresponds to access to a given file and typically includes a file pointer, access flags and offset position of the file. FIG. 3A is a representation of a portion 300 of a table of applications maintained by the operating system (not shown) in memory, such as memories 103, 153, or cache memories 103A, 153A, or memory 123, of a computing device, such as computing devices 100 or 150, or server system 120 of FIG. 1. discussed above, implementing all, or part, of the anti-virus application and/or process for scanning exclusively locked files 200.

As shown in FIG. 3A, portion 300 of a table of applications includes exemplary applications: WINWORD.EXE application 310; CALC.EXE application 320; NOTEPAD.EXE application 330; and VIRUS.EXE application 340. As also shown in FIG. 3A, WINWORD.EXE application 310; NOTEPAD.EXE application 330; and VIRUS.EXE application 340 also include their respective file handles for accessing their respective files.

For example, WINWORD.EXE application 310 includes MyDocuments.doc handle 312 for accessing a MyDocumnets.doc file (not shown) and WinWord.exe handle 314 for accessing a WinWord.exe file (not shown). Similarly, NOTEPAD.EXE application 330 includes TextFile.text handle 332 for accessing a TextFile.text file (not shown). Similarly, VIRUS.EXE application 340, shown herein as an example of a virus application, has its own access handles such as Virus.exe handle 342 for accessing a Virus.exe file (not shown).

Unlike, WINWORD.EXE application 310, NOTEPAD.EXE application 330, and VIRUS.EXE application 340, CALC.EXE application 320 does not have any associated files and, therefore, CALC.EXE application 320 does not have any handles.

As also shown in FIG. 3A, each of the handles: MyDocuments.doc handle 312; WinWord.exe handle 314; TextFile.text handle 332; and Virus.exe handle 342, includes a file pointer, access flags, and offset.

For example, MyDocuments.doc handle 312 includes: MyDocuments.doc file pointer 312A, that identifies the file as MyDocuments.doc; Read-Write access flag 312B, that indicates Read-Write access, and Offset 312C that indicates that the file MyDocuments.doc is located at an offset of "0".

Similarly, WinWord.exe handle 314 includes: WinWord.exe file pointer 314A, that identifies the file as WinWord.exe; Read-Only access flag 314B, that indicates Read-Only access, and Offset 314C that indicates that the file WinWord.exe is located at an offset of "300".

Similarly, TextFile.text handle 332 includes: TextFile.text file pointer 332A, that identifies the file as TextFile.text; Read-Write access flag 332B, that indicates Read-Write access for the file TextFile.text, and Offset 332C that indicates that the file TextFile.text is located at an offset of "2000".

Each of the handles MyDocuments.doc handle 312, WinWord.exe handle 314, and TextFile.text handle 332, discussed so far, is a non-locked handle. Consequently, the handles MyDocuments.doc handle 312, WinWord.exe handle 314, and TextFile.text handle 332, are not "owned" by their respective parent applications, WINWORD.EXE application 310, and NOTEPAD.EXE application 330. Therefore, reference numbers associated with these handles can be passed to any application requesting access to the files MyDocuments.doc, WinWord.exe, and TextFile.text by the operating system through a kernel mode driver. Therefore, when access to any of these files is requested by any application, such as an anti-virus application, such as ANTI.VIRUS.EXE application 350 discussed below, the access handle reference number (not shown) associated with the appropriate handle is passed over to the requesting application and the file is accessed.

Also shown in FIG. 3A is ANTI.VIRUS.EXE application 350. The operating system keeps copies in the list of applications of all of the handles, 352, 354, and 356, for all the files, of all the applications ANTI.VIRUS.EXE application 350 accesses to be scanned in handle list 360 of ANTI.VIRUS.EXE application 350. For instance, as seen in FIG. 3A, in one embodiment, ANTI.VIRUS.EXE application 350 handle list 360 includes: a copy 352 of MyDocuments.doc handle 312; a copy 354 of WinWord.exe handle 314; and a copy 356 of TextFile.text handle 332. However, as discussed in more detail below, prior to process for scanning exclusively locked files 200, notably absent from ANTI.VIRUS.EXE application 350 handle list 360 is a copy of any handle for VIRUS.EXE application 340 and Virus.exe handle 344.

As noted above, VIRUS.EXE application 340 is shown herein as part of portion 300 of a table of applications as an example of a virus application having its own access handle Virus.exe handle 342. However, unlike the other handles discussed above, Virus.exe handle 342 is an exclusively locked access handle owned by VIRUS.EXE application 340 and is therefore, absent process for scanning exclusively locked files 200, not available to other applications, such as an anti-virus application, and the operating system will not, absent process for scanning exclusively locked files 200, pass these handles over to other applications, such ANTI-VIRUS.EXE application 350.

As shown in FIG. 3A, similar to the other, non-locked, handles discussed above, Virus.exe handle 342 includes: Virus.exe file pointer 342A, that identifies the file as Virus.exe; Read-Only access flag 342B, that indicates Read-Only access for the file Virus.exe, and Offset 342C that indicates that the file Virus.exe is located at an offset of "200". However, Virus.exe handle 342 further includes EXCLUSIVE lock flag 344E. As explained above, and discussed in more below, EXCLUSIVE lock flag 344E exclusively locks the file Virus.exe for use by VIRUS.EXE application 340 only. This is often done by virus code Authors to prevent an anti-virus application, such as ANTI.VIRUS.EXE application 350, from accessing, and scanning, the file Virus.exe.

In one embodiment, the data associated with, and comprising, portion 300 of a table of applications is saved by storing the data, in whole, or in part, by any one of the numerous mechanisms known to those of skill in the art. For instance, in one embodiment, the data, in whole, or in part, is stored in a memory system, such as memory systems 103, 153, or server memory system 123, or database 170, of FIG. 1, or in a cache memory, such as cache memory 103A or 153A of FIG. 1, or in any main memory or mass memory, associated with a computing device, such as computing devices 100, 151, described above. In one embodiment, the data, in whole, or in part, is stored in any computing device and/or server system, such as computing devices 100, 151, or server system 120, or other device, in another location, or on/in computer readable medium, and/or any other computer program product, as defined herein. In one embodiment, the data, in whole, or in part, is stored on a webpage or in a web-based system.

Application tables, access handle reference numbers, handles, their structures, operation, and use, are well known to those of skill in the art and are therefore not discussed in more detail herein to avoid detracting from the present disclosure.

Once the anti-virus application, such as ANTI.VIRUS.EXE application 350 (FIG. 3A), requests access to a file at ANTI-VIRUS APPLICATION REQUESTS FILE ACCESS OPERATION 203, process flow proceeds to ACCSESS PERMITTED? OPERATION 205. At ACCSESS PERMITTED? OPERATION 205, a determination is made as to whether the file access requested will be permitted. If at ACCSESS PERMITTED? OPERATION 205 the file is accessible, i.e., a "YES" result is obtained at ACCSESS PERMITTED? OPERATION 205, then, as discussed above, the operating system returns the reference number associated with the appropriate handle to the anti-virus application, typically via a kernel mode driver, for accessing the file, permission is thereby granted to access the file, and process flow proceeds to ACCESS FILE AND PERFORM AVP SCAN OPERATION 221, where the anti-virus application scans the file in accordance with its normal operating procedure. In one embodiment, once the file is accessed and scanned at ACCESS FILE AND PERFORM AVP SCAN OPERATION 221, process for scanning exclusively locked files 200 is exited at EXIT OPERATION 223.

On the other hand, if the requested access to the file is not available, such as is the case when the requested file is an exclusively locked file, such as the file Virus.exe of the VIRUS.EXE application 340 (FIG. 3A), at ACCSESS PERMITTED? OPERATION 205 (FIG. 2), i.e., a "NO" result is obtained at ACCSESS PERMITTED?OPERATION 205, then, instead of returning the reference number associated with the access handle, such as Virus.exe handle 342 (FIG. 3), the operating system returns an error "access denied" signal/message and denies the anti-virus application, or any application other than the application owning the exclusive lock, such as VIRUS.EXE application 340 (FIG. 3A), access to the file.

As discussed above, exclusively locked files are currently used by virus Authors to prevent an anti-virus application, such as ANTI.VIRUS.EXE application 350 (FIG. 3A), from accessing, and scanning, virus files, such as the file virus.exe discussed above. Using exclusively locked files to prevent an anti-virus application from accessing, and scanning, and therefore detecting and removing, virus code is an effective method. This is because, currently, once a file has been exclusively locked, by, for example, an exclusive lock flag such as EXCLUSIVE lock flag 344E (FIG. 3A), the file is "owned" by the parent application, such as ANTI.VIRUS.EXE application 350, and any other application, program, or process, ANTI.VIRUS.EXE application 350, can not open the exclusively locked file for reading or scanning. Consequently, the anti-virus application can potentially fail to detect the virus code and fail to identify the file, and the parent application, as malevolent, i.e., the anti-virus application scan can return a "false negative" result in the presence of exclusively locked virus files.

Returning to FIG. 2, in light of the misuse of exclusively locked files by virus Authors, according to one embodiment of process for scanning exclusively locked files 200, if at ACCSESS PERMITTED? OPERATION 205, access to the file is not available, such as is the case when the requested file is an exclusively locked file, then process flow proceeds to CALL KERNEL MODE DRIVER TO SEARCH HANDLES OPERATION 207.

In one embodiment, at CALL KERNEL MODE DRIVER TO SEARCH HANDLES OPERATION 207, a kernel mode driver (not shown) is called to insert itself into the chain of kernel mode drivers that access the file system in the kernel mode of the operating system. In one embodiment, the kernel mode driver goes into a table of applications, such as portion 300 of a table of applications (FIG. 3A), maintained by the operating system in a memory, such as memories 103, 153, or cache memories 103A, 153A, or memory 123, of a computing device, such as computing devices 100 or 150, or server system 120 of FIG. 1, discussed above, implementing all, or part, of the anti-virus application and/or process for scanning exclusively locked files 200 (FIG. 2). As discussed below, in one embodiment, the kernel mode driver accesses the table of applications to find any exclusively locked handles associated with a given application.

Kernel mode drivers, their structure, operation, and use, are well known to those of skill in the art. Consequently, the various structures, methods of construction, and operation of kernel mode drivers are not discussed further herein to avoid detracting from the disclosure.

As briefly noted above, once the kernel mode driver is called at CALL KERNEL MODE DRIVER TO SEARCH HANDLES OPERATION 207, process flow proceeds to SEARCH APPLICATIONS TABLE FOR EXCLUSIVELY LOCKED HANDLES OPERATION 209. At SEARCH APPLICATIONS TABLE FOR EXCLUSIVELY LOCKED HANDLES OPERATION 209, the kernel mode driver moves to insert itself into the chain of kernel mode drivers that access the computing device's file system and then goes into the table of applications, such as portion 300 of a table of applications (FIG. 3A), in the kernel mode of the operating system to scan for, and identify, exclusively locked handles.

For example, referring to FIG. 2 and FIG. 3A together, in one embodiment, the kernel mode driver scans portion 300 of a table of applications (FIG. 3A) at SEARCH APPLICATIONS TABLE FOR EXCLUSIVELY LOCKED HANDLES OPERATION 209 (FIG. 2) looking for handles, such as Virus.exe handle 342 (FIG. 3A) of VIRUS.EXE application 340, that include exclusive locks as indicated by an exclusive lock flag, such as EXCLUSIVE lock flag 342E, indicating an exclusively locked file, such as the file Virus.exe of VIRUS.EXE application 340

In one embodiment, the kernel mode driver scanning the table of applications, such as portion 300 of a table of applications, at SEARCH APPLICATIONS TABLE FOR EXCLUSIVELY LOCKED HANDLES OPERATION 209 (FIG. 2) can readily identify a handle, such as Virus.exe handle 342 of VIRUS.EXE application 340 (FIG. 3A) that owns an exclusively lock since the handle list from the table of applications, such as portion 300 of a table of applications, can readily be retrieved for a suspect application, such as VIRUS.EXE application 340, along with the name of the exclusively locked file, such as Virus.exe, from the file pointer, such as Virus.exe file pointer 342A, to which the handle, such as Virus.exe handle 342, refers. In addition, the list of handles associated with an exclusively locked file is, by definition, small, because there can only be one handle that owns the exclusive lock, and any other handles associated with the application do not have access to the file at all. Consequently, retrieving the relevant handle list from the operating system's table of applications is a relatively simple, and fast, procedure.

The scanning of data structures, such as portion 300 of a table of applications (FIG. 3A), is well known to those of skill in the art. Consequently, the details of scanning a data structure, such as portion 300 of a table of applications, using a kernel mode driver, are not discussed further herein to avoid detracting from the disclosure.

In one embodiment, once the table of applications, such as portion 300 of a table of applications (FIG. 3A), is scanned for exclusively locked handles, and the exclusively locked handles are identified at SEARCH APPLICATIONS TABLE FOR EXCLUSIVELY LOCKED HANDLES OPERATION 209 (FIG. 2), process flow proceeds to IS HANDLE READ ONLY EXCLUSIVE? OPERATION 211.

In one embodiment, at IS HANDLE READ ONLY EXCLUSIVE? OPERATION 211, a determination is made as to whether the flag, such as EXCLUSIVE flag 342E of Virus.exe handle 342 (FIG. 3A) of the handle identified at SEARCH APPLICATIONS TABLE FOR EXCLUSIVELY LOCKED HANDLES OPERATION 209 as an exclusively locked handle, also includes a Read-Only flag component, such as Read-Only flag 342B of Virus.exe handle 342 (FIG. 2). In one embodiment, if a determination is made at IS HANDLE READ ONLY EXCLUSIVE? OPERATION 211 that the handle identified at SEARCH APPLICATIONS TABLE FOR EXCLUSIVELY LOCKED HANDLES OPERATION 209 as an exclusively locked handle does not include a Read-Only flag, but instead has a flag permitting some other access, such as Read-Write or Write-Only, then a "NO" result is obtained at IS HANDLE READ ONLY EXCLUSIVE? OPERATION 211 and process flow proceeds to DO NOT ACCESS FILE OPERATION 213 and on to EXIT OPERATION 223 where process for scanning exclusively locked files 200 is exited.

In one embodiment, process flow proceeds to DO NOT ACCESS FILE OPERATION 213, and the exclusively locked file is not allowed to be accessed, if at IS HANDLE READ ONLY EXCLUSIVE? OPERATION 211 a "NO" result is obtained, to prevent process for scanning exclusively locked files 200 from interfering with applications backing up data for the computer device implementing all, or part, of process for scanning exclusively locked files 200. This is because back up applications often designate files being backed up as Read-Write exclusive locks to ensure no changes are made to the file during back up. These back up applications also use Write-Only exclusive locks when restoring files. Consequently, there are legitimate uses for Read-Write exclusive locks and Write-Only exclusive locks and in order to prevent process for scanning exclusively locked files 200 from interfering with these legitimate functions the exclusively locked file is not allowed to be accessed if at IS HANDLE READ ONLY EXCLUSIVE? OPERATION 211 a "NO" result is obtained.

On the other hand, in one embodiment, if a determination is made at IS HANDLE READ ONLY EXCLUSIVE? OPERATION 211 that the handle identified at SEARCH APPLICATIONS TABLE FOR EXCLUSIVELY LOCKED HANDLES OPERATION 209 as an exclusively locked handle does include a Read-Only flag, then a "YES" result is obtained at IS HANDLE READ ONLY EXCLUSIVE? OPERATION 211 and process flow proceeds to COPY HANDLE DATA OPERATION 215.

In one embodiment, at COPY HANDLE DATA OPERATION 215, the kernel mode driver of CALL KERNEL MODE DRIVER TO SEARCH HANDLES OPERATION 207, and SEARCH APPLICATIONS TABLE FOR EXCLUSIVELY LOCKED HANDLES OPERATION 209, copies the data associated with, and describing, the handle, such as Virus.exe handle 342 (FIG. 3A), identified at SEARCH APPLICATIONS TABLE FOR EXCLUSIVELY LOCKED HANDLES OPERATION 209 (FIG. 2) as an exclusively locked handle. Once the data associated with the exclusively locked handle, such as Virus.exe handle 342 (FIG. 3A), is copied at COPY HANDLE DATA OPERATION 215 (FIG. 2), process flow proceeds to ADD HANDLE TO AVP HANDLE LIST OPERATION 217.

In one embodiment, at ADD HANDLE TO AVP HANDLE LIST OPERATION 217, the copied handle is added to a list of handles of the anti-virus application, such as ANTI-VIRUS.EXE application 350. FIG. 3B is a representation of portion 300 of a table of applications of FIG. 3A, subsequent to ADD HANDLE TO AVP HANDLE LIST OPERATION 217 of process for scanning exclusively locked files 200. As seen in FIG. 3B, after ADD HANDLE TO AVP HANDLE LIST OPERATION 217, a copy Virus.exe handle 358 of Virus.exe handle 342, copied by the kernel mode driver at COPY HANDLE DATA OPERATION 215 now appears in the list of handles 360 of ANTI-VIRUS.EXE application 350. Once the copied handle is added to a list of handles of the anti-virus application at ADD HANDLE TO AVP HANDLE LIST OPERATION 217 process flow proceeds to PASS ACCESS HANDLE REFERENCE NUMBER TO AVP OPERATION 219.

In one embodiment, at PASS ACCESS HANDLE REFERENCE NUMBER TO AVP OPERATION 219, the access handle reference number associated with the handle, such as Virus.exe handle 342 (FIG. 3A), identified at SEARCH APPLICATIONS TABLE FOR EXCLUSIVELY LOCKED HANDLES OPERATION 209 (FIG. 2) as an exclusively locked handle, is passed to the anti-virus application, such as VIRUS.EXE application 350 (FIG. 3A), that had tried to access the exclusively locked file, such as virus.exe file, at ANTI-VIRUS APPLICATION REQUESTS FILE ACCESS OPERATION 203 (FIG. 2) and was denied access at ACCSESS PERMITTED? OPERATION 205. Armed with the access handle reference number associated with the handle, such as Virus.exe handle 342, the anti-virus application, such as ANTI-VIRUS.EXE application 350, process flow proceeds to ACCESS FILE AND PERFORM AVP SCAN OPERATION 221.

In one embodiment, at ACCESS FILE AND PERFORM AVP SCAN OPERATION 221, the anti-virus application, such as ANTI-VIRUS.EXE application 350, accesses the formally exclusively locked file and performs a file scan as it would in normal operation with any file and process for scanning exclusively locked files 200 is exited at EXIT OPERATION 223. Consequently, using process for scanning exclusively locked files 200, the anti-virus effectively breaks the exclusive lock.

The following is a specific illustrative example of a hypothetical operation of process for scanning exclusively locked files 200 as it would be applied to access the exclusively locked file Virus.exe, discussed above. The following specific illustrative example is presented strictly to help those of skill in the art understand the operation of one embodiment of a process for scanning exclusively locked files, such as process for scanning exclusively locked files 200, and therefore does not limit the invention in any way to this one specific illustrative example.

In this specific illustrative example, we will stipulate that process for scanning exclusively locked files 200 is an application residing, in whole, or in part, in a memory system, such as memories 103, 153, or cache memories 103A, 153A, or memory 123, of a computing device, such as computing devices 100 or 150, or server system 120 of FIG. 1. In this specific illustrative example, we will further stipulate that process for scanning exclusively locked files 200 is part of a parent anti-virus system (not shown) implemented for protecting the computing device from malicious code. In this specific illustrative example, we will further stipulate that the parent anti-virus system includes an anti-virus scanner application ANTI-VIRUS.EXE application 350 (FIG. 3B), in addition to process for scanning exclusively locked files 200.

In this specific illustrative example, process for scanning exclusively locked files 200 begins at ENTER OPERATION 201. From ENTER OPERATION 201, process flow proceeds to ANTI-VIRUS APPLICATION REQUESTS FILE ACCESS OPERATION 203 where ANTI-VIRUS.EXE application 350 (FIG. 3A) of the parent anti-virus system requests access to the file Virus.exe (FIG. 3A) for scanning. Process flow then proceeds to ACCSESS PERMITTED? OPERATION 205 (FIG. 2).

In this specific illustrative example, since the file Virus.exe is exclusively locked and owned by VIRUS.EXE application 340 (FIG. 3A), Virus.exe handle 342 includes EXCLUSIVE lock flag 342E and access is denied ANTI-VIRUS.EXE application 350 (FIG. 3B) at ACCSESS PERMITTED? OPERATION 205 (FIG. 2), i.e., a "NO" result is obtained and process flow proceeds to CALL KERNEL MODE DRIVER TO SEARCH HANDLES OPERATION 207, where a kernel mode driver (not shown) is called to insert itself into the chain of kernel mode drivers that access the file system in the kernel mode of the operating system and process flow proceeds to SEARCH APPLICATIONS TABLE FOR EXCLUSIVELY LOCKED HANDLES OPERATION 209.

In this specific illustrative example, at SEARCH APPLICATIONS TABLE FOR EXCLUSIVELY LOCKED HANDLES OPERATION 209, the kernel mode driver goes into portion 300 of a table of applications (FIG. 3A), in the kernel mode of the operating system of the computing device to scan for, and identify, exclusively locked handles and finds Virus.exe handle 342 (FIG. 3A) of VIRUS.EXE application 340, that includes an exclusive lock as indicated by EXCLUSIVE lock flag 342E.

In this specific illustrative example, once the portion 300 of a table of applications, is scanned for exclusively locked handles, and exclusively locked handle Virus.exe handle 342 is identified at SEARCH APPLICATIONS TABLE FOR EXCLUSIVELY LOCKED HANDLES OPERATION 209 (FIG. 2), process flow proceeds to IS HANDLE READ ONLY EXCLUSIVE? OPERATION 211.

In this specific illustrative example, at IS HANDLE READ ONLY EXCLUSIVE? OPERATION 211, a determination is made that EXCLUSIVE flag 342E of Virus.exe handle 342 (FIG. 3A) includes Read-Only flag 342B, i.e., a "YES" result is obtained at IS HANDLE READ ONLY EXCLUSIVE? OPERATION 211 (FIG. 2) and process flow proceeds to COPY HANDLE DATA OPERATION 215.

In this specific illustrative example, at COPY HANDLE DATA OPERATION 215, the kernel mode driver of CALL KERNEL MODE DRIVER TO SEARCH HANDLES OPERATION 207, and SEARCH APPLICATIONS TABLE FOR EXCLUSIVELY LOCKED HANDLES OPERATION 209, copies the data associated with Virus.exe handle 342 (FIG. 3A). Once the data associated with the Virus.exe handle 342, is copied at COPY HANDLE DATA OPERATION 215 (FIG. 2), process flow proceeds to ADD HANDLE TO AVP HANDLE LIST OPERATION 217.

At ADD HANDLE TO AVP HANDLE LIST OPERATION 217, the copy of Virus.exe handle 342, Virus.exe handle 358, is added to the ANTI-VIRUS.EXE application 350 list of handles 360 (FIG. 3B) and process flow proceeds to PASS ACCESS HANDLE REFERENCE NUMBER TO AVP OPERATION 219

At PASS ACCESS HANDLE REFERENCE NUMBER TO AVP OPERATION 219, the access handle reference number (not shown) associated with the copy of Virus.exe handle 342, Virus.exe handle 358, is passed to ANTI-VIRUS.EXE application 350 (FIG. 3B), Armed with the access handle reference number process flow proceeds to ACCESS FILE AND PERFORM AVP SCAN OPERATION 221.

At ACCESS FILE AND PERFORM AVP SCAN OPERATION 221, ANTI-VIRUS.EXE application 350 accesses the formally exclusively locked file and performs a file scan as it would in normal operation with any file. Therefore, ANTI-VIRUS.EXE application 350 accesses the formally exclusively locked file Virus.exe and performs a file scan as it would in normal operation with any file. Consequently, using process for scanning exclusively locked files 200, the parent system effectively breaks the exclusive lock on the file Virus.exe.

In one embodiment, the various data generated by, and used by, process for scanning exclusively locked files 200 is saved by storing the data, in whole, or in part, by any one of the numerous mechanisms known to those of skill in the art. For instance, in one embodiment, the data, in whole, or in part, is stored in a memory system, such as memory systems 103, 153, or server memory system 123, or database 170, of FIG. 1, or in a cache memory, such as cache memory 103A or 153A of FIG. 1, or in any main memory or mass memory, associated with a computing device, such as computing devices 100, 151, described above. In one embodiment, the data, in whole, or in part, is stored in any computing device and/or server system, such as computing devices 100, 151, or server system 120, or other device, in another location, or on/in computer readable medium, and/or any other computer program product, as defined herein. In one embodiment, the data, in whole, or in part, is stored on a webpage or in a web-based system.

In some embodiments, the means for storing all, or part, of a process for scanning exclusively locked files, such as process for scanning exclusively locked files 200, such as those listed above, are maintained, in whole, or in part, by: the user of a process for scanning exclusively locked files, such as process for scanning exclusively locked files 200 described below, or a user computing device; the provider of the process for scanning exclusively locked files, such as process for scanning exclusively locked files 200 described below; the provider of a parent software system implementing a process for scanning exclusively locked files, such as process for scanning exclusively locked files 200 described below; or any other parties.

The method and apparatus for scanning exclusively locked files described above provides an anti-virus application the capability to access, and scan, formally inaccessible exclusively locked files so that exclusively locked virus files can be detected, and removed from a computing device.

In addition, as discussed in more detail above, using the embodiments described above, with little or no modification and/or user input, there is considerable flexibility, adaptability, and opportunity for customization to meet the specific needs of various users under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and or functionality of the invention may be implemented via various combinations of software and hardware, as described, or entirely in hardware elements. Also, particular divisions of functionality between the various components described herein is merely exemplary, and not mandatory or significant. Consequently, functions performed by a single component may, in other embodiments, be performed by multiple components, and functions performed by multiple components may, in other embodiments, be performed by a single component.

Some portions of the above description may present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing devices. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "determining" or "scanning", or "comparing", refer to the action and processes of a computing device or similar electronic device that manipulates and operates on data represented as physical (electronic) quantities within the computing device memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus for performing the operations described herein. This apparatus may be specifically constructed for the required purposes, or the apparatus can comprise a general purpose system selectively activated or configured/re-configured by a computer program stored on a computer program product, as defined herein, that can be accessed by a computing device or other device.

As discussed above, herein, a computer program product comprises a medium configured to store or transport computer readable code. Some examples of computer program products are CD-ROM discs, DVDs, ROM cards, floppy discs, magnetic tapes, computer hard drives, servers on a network, such as server system 120 of FIG. 1, and signals transmitted over a network or other media or methods capable of delivering computer readable data representing computer readable code. This medium may belong to a computing device. However, the medium also may be removed from the computing device.

Those of skill in the art will readily recognize that the algorithms and/or operations presented herein are not inherently related to any particular computing device, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a network, such as a LAN, WAN, or the Internet, or other network capable of allowing communication between two or more computing devices.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

Those of skill in the art will readily recognize that the particular operations, and the order of performing those operations, shown above for a process for scanning exclusively locked files, such as process for scanning exclusively locked files 200, were chosen for illustrative purposes only and that a process for scanning exclusively locked files, such as process for scanning exclusively locked files 200, described above, can be implemented with a lesser number or greater number of operations in a given embodiment, and that those operations can be performed in any logical order desired, based on the needs of the user.

In addition, the operations shown in the FIG.s for a process for scanning exclusively locked files, such as process for scanning exclusively locked files 200, discussed above, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computer implemented method for scanning exclusively locked files comprising:
    providing a computing device;
    providing a memory system associated with the computing device, the memory system including instructions associated with an operating system, the operating system being associated with the computing device;
    providing an anti-virus scanning application, the anti-virus scanning application including anti-virus scanning application computer device instructions, at least part of the anti-virus scanning application computer device instructions being stored in the memory system associated with the computing device, the anti-virus scanning application being implemented by the computing device, said anti-virus scanning application requesting access to an exclusively locked file in the memory system associated with the computing device and said anti-virus scanning application being denied access to said exclusively locked file by an operating system of a the computer device;
    providing a kernel mode driver to said anti-virus scanning application;
    searching an application table of said operating system associated with said computing device implementing said anti-virus scanning application for an exclusively locked handle associated with said exclusively locked file using said kernel mode driver;
    identifying an exclusively locked handle associated with said exclusively locked file;
    copying said exclusively locked handle associated with said exclusively locked file; and
    adding said copy of said exclusively locked handle associated with said exclusively locked file to a handle list of said anti-virus scanning application.

2. The computer implemented method for scanning exclusively locked files of claim 1, further comprising;
    after identifying an exclusively locked handle associated with said exclusively locked file, determining if said exclusively locked handle associated with said exclusively locked file includes a Read-Only flag.

3. The computer implemented method for scanning exclusively locked files of claim 2, further comprising;
    preventing access to said exclusively locked file by said anti-virus scanning application if said exclusively locked handle associated with said exclusively locked file includes a Read-Write flag.

4. The computer implemented method for scanning exclusively locked files of claim 2, further comprising;
    preventing access to said exclusively locked file by said anti-virus scanning application if said exclusively locked handle associated with said exclusively locked file includes a Write-Only flag.

5. The computer implemented method for scanning exclusively locked files of claim 2, further comprising;
    preventing access to said exclusively locked file by said anti-virus scanning application if said exclusively locked handle associated with said exclusively locked file does not include a Read-Only flag.

6. A system for scanning exclusively locked files comprising:
    a computing device;
    a memory system associated with the computing device, the memory system including instructions associated with an operating system, the operating system being associated with the computing device;
    an anti-virus scanning application, the anti-virus scanning application including anti-virus scanning application computer device instructions, at least part of the anti-virus scanning application computer device instructions being stored in the memory system associated with the computing device, the anti-virus scanning application being implemented by the computing device;
    a processor coupled said memory system, the processor executing at least some of the anti-virus scanning application computer device instructions:
    a kernel mode driver, the kernel mode driver being provided to said anti-virus scanning application upon said anti-virus scanning application requesting access to an exclusively locked file and said anti-virus scanning application being denied access to said exclusively locked file, the kernel mode driver for searching an application table of the operating system associated with the computer device implementing said anti-virus scanning application for an exclusively locked handle associated with said exclusively locked file, the kernel mode driver being used in conjunction with the anti-virus scanning application to:
    identify an exclusively locked handle associated with said exclusively locked file;
    copy said exclusively locked handle associated with said exclusively locked file; and
    add said copy of said exclusively locked handle associated with said exclusively locked file to a handle list of said anti-virus scanning application.

7. The system for scanning exclusively locked files of claim 6, wherein execution of the said process for scanning exclusively locked files application generates a method further comprising;
    after identifying an exclusively locked handle associated with said exclusively locked file, determining if said exclusively locked handle associated with said exclusively locked file includes a Read-Only flag.

8. The system for scanning exclusively locked files of claim 7, wherein execution of the said process for scanning exclusively locked files application generates a method further comprising;
    preventing access to said exclusively locked file by said anti-virus scanning application if said exclusively locked handle associated with said exclusively locked file includes a Read-Write flag.

9. The system for scanning exclusively locked files of claim 7, wherein execution of the said process for scanning exclusively locked files application generates a method further comprising;
  preventing access to said exclusively locked file by said anti-virus scanning application if said exclusively locked handle associated with said exclusively locked file includes a Write-Only flag.

10. The system for scanning exclusively locked files of claim 7, wherein execution of the said process for scanning exclusively locked files application generates a method further comprising;
  preventing access to said exclusively locked file by said anti-virus scanning application if said exclusively locked handle associated with said exclusively locked file does not include a Read-Only flag.

11. An apparatus for scanning exclusively locked files comprising:
  a computing device;
  a memory system associated with the computing device, the memory system including instructions associated with an operating system, the operating system being associated with the computing device;
  an anti-virus scanning application, the anti-virus scanning application including anti-virus scanning application computer device instructions, at least part of the anti-virus scanning application computer device instructions being stored in the memory system associated with the computing device, the anti-virus scanning application being implemented by the computing device;
  means for searching an application table of said operating system associated with said computer device implementing said anti-virus scanning application for an exclusively locked handle associated with said exclusively locked file, the means for searching the application table of said operating system associated with said computer device implementing said anti-virus scanning application for an exclusively locked handle associated with said exclusively locked file being provided to said anti-virus scanning application upon said anti-virus scanning application requesting access to an exclusively locked file and said anti-virus scanning application being denied access to said exclusively locked file;
  means for identifying an exclusively locked handle associated with said exclusively locked file;
  means for copying said exclusively locked handle associated with said exclusively locked file; and
  means for adding said copy of said exclusively locked handle associated with said exclusively locked file to a handle list of said anti-virus scanning application.

12. The apparatus for scanning exclusively locked files of claim 11, further comprising;
  means for determining if said exclusively locked handle associated with said exclusively locked file includes a Read-Only flag.

13. The apparatus for scanning exclusively locked files of claim 12, further comprising;
  means for preventing access to said exclusively locked file by said anti-virus scanning application if said exclusively locked handle associated with said exclusively locked file includes a Read-Write flag.

14. The apparatus for scanning exclusively locked files of claim 12, further comprising;
  means for preventing access to said exclusively locked file by said anti-virus scanning application if said exclusively locked handle associated with said exclusively locked file includes a Write-Only flag.

15. The apparatus for scanning exclusively locked files of claim 12, further comprising;
  means for preventing access to said exclusively locked file by said anti-virus scanning application if said exclusively locked handle associated with said exclusively locked file does not include a Read-Only flag.

* * * * *

UNITED STATES PATENT AND TRADEMARK OFFICE
CERTIFICATE OF CORRECTION

PATENT NO.        : 7,698,742 B1
APPLICATION NO. : 11/398037
DATED             : April 13, 2010
INVENTOR(S)       : Peter Ferrie It is certified that error appears in the above-identified patent and that said Letters Patent is hereby corrected as shown below:

In Column 17, Lines 41-42, Claim 1, between "system of" and "the computer", delete "a".

Signed and Sealed this

Fifteenth Day of June, 2010

David J. Kappos
*Director of the United States Patent and Trademark Office*